(12) United States Patent
Gose et al.

(10) Patent No.: US 11,837,984 B2
(45) Date of Patent: Dec. 5, 2023

(54) DUAL SUPPLY DUAL CONTROL ARCHITECTURE

(71) Applicant: DELPHI TECHNOLOGIES IP LIMITED, St. Michael (BB)

(72) Inventors: Mark W. Gose, Kokomo, IN (US); Mitchell Cohen, Carmel, IN (US); Tushar Nachnani, Carmel, IN (US); Christopher Klaus, Kokomo, IN (US)

(73) Assignee: Delphi Technologies IP Limited, St. Michael (BB)

( * ) Notice: Subject to any disclaimer, the term of this patent is extended or adjusted under 35 U.S.C. 154(b) by 162 days.

(21) Appl. No.: 17/320,752

(22) Filed: May 14, 2021

(65) Prior Publication Data

US 2022/0368268 A1 Nov. 17, 2022

(51) Int. Cl.
*H02P 29/024* (2016.01)
*H02P 27/06* (2006.01)
*B60L 53/20* (2019.01)
*B60L 3/00* (2019.01)
*B60L 15/00* (2006.01)

(52) U.S. Cl.
CPC ............ *H02P 29/024* (2013.01); *B60L 3/003* (2013.01); *B60L 15/007* (2013.01); *B60L 53/20* (2019.02); *H02P 27/06* (2013.01)

(58) Field of Classification Search
USPC .................................................... 318/400.21
See application file for complete search history.

(56) References Cited

U.S. PATENT DOCUMENTS

| 8,558,499 B2 | 10/2013 | Ozaki et al. |
| 9,948,219 B2* | 4/2018 | Saha ....................... H02P 27/06 |
| 2012/0013182 A1 | 1/2012 | Minegishi et al. |
| 2012/0032505 A1* | 2/2012 | Kusumi .................. B60L 58/18 |
| | | 307/10.1 |
| 2012/0248869 A1 | 10/2012 | Itagaki et al. |
| 2013/0175959 A1* | 7/2013 | Fukuta ................. H03K 17/168 |
| | | 318/400.27 |
| 2016/0006237 A1 | 1/2016 | Helmerth et al. |
| 2017/0008404 A1 | 1/2017 | Oba et al. |

(Continued)

OTHER PUBLICATIONS

CN 112684337 A "Fault Diagnosis Circuit for Switching Element, Method and Electronic Device Thereof" Date Published: Apr. 20, 2021 Inventor:Lin, Tian-Sheng (Year: 2021).*

(Continued)

*Primary Examiner* — Jorge L Carrasquillo
(74) *Attorney, Agent, or Firm* — Joshua M. Haines; Bookoff McAndrews, PLLC

(57) ABSTRACT

A system for an inverter includes a first integrated circuit configured to: provide power to a first set of switches, and selectively control the first set of switches and a second set of switches; a second integrated circuit configured to provide power to the second set of switches; and an electric motor being connected to the first set of switches and the second set of switches, wherein, the second integrated circuit is further configured to: in response to an a fault detected in the first integrated circuit, selectively control the first set of switches and the second set of switches, and, in response to at least one voltage value corresponding to a voltage of the first set of switches being outside of a threshold, performing a safe state operation.

20 Claims, 6 Drawing Sheets

(56) References Cited

U.S. PATENT DOCUMENTS

2019/0097565 A1* 3/2019 Hayakawa .............. H02P 6/085
2019/0305545 A1 10/2019 Matsumoto
2021/0050799 A1* 2/2021 Ogura .................. H02H 7/1225

OTHER PUBLICATIONS

Extended European search report in EP application 22 171 467.8, dated Oct. 4, 2022 (8 pages).

* cited by examiner

DUAL SUPPLY DUAL CONTROL ARCHITECTURE

TECHNICAL FIELD

This disclosure relates to vehicle electric motors, and in particular, to systems and methods for dual supply dual control of vehicle electric motors.

BACKGROUND

Vehicles, such as cars, trucks, sport utility vehicles, crossovers, mini-vans, or other suitable vehicles, typically include various electric motors, such as permanent magnet motors or other suitable electric motors. Such electric motors may be used for various aspects of vehicle control or operation, such as vehicle prolusion or other suitable aspects of vehicle control or operation.

Typically, an inverter or frequency converter (e.g., which may be referred to as an inverter system) controls speed or torque of such an electric motor. For example, the inverter may receive power from one or more power sources and may regulate power provided to the electric motor to control the motor speed or torque. During operation, in the event of a failure in a component of the inverter system may be configured to maintain system safety. This is typically achieved, while a failure is present, by applying a minimum amount torque to the electric motor and by limiting back electromotive force (back emf) voltage from the electric motor (e.g., such that the back emf is lower than a voltage from a high voltage battery of the vehicle).

SUMMARY

This disclosure relates generally to vehicle electric motors.

An aspect of the disclosed embodiments includes a system for an inverter. The system includes a first integrated circuit configured to: provide power to a first set of switches using a first high voltage supply and a first low voltage supply the first high voltage supply and the first low voltage supply being connected to the first integrated circuit, and selectively control the first set of switches and a second set of switches; a second integrated circuit configured to provide power to the second set of switches using a second high voltage supply and a second low voltage supply, the second high voltage supply and the second low voltage supply being connected to the second integrated circuit; and an electric motor being connected to the first set of switches and the second set of switches, wherein, the second integrated circuit is further configured to: in response to a fault detected in the first integrated circuit, selectively control the first set of switches and the second set of switches, and, in response to at least one voltage value corresponding to a voltage of the first set of switches being outside of a threshold, performing a safe state operation.

Another aspect of the disclosed embodiments includes a method. The method includes providing, using a first integrated circuit, power to a first set of switches using a first high voltage supply and a first low voltage supply the first high voltage supply and the first low voltage supply being connected to the first integrated circuit. The method also includes selectively controlling, using the first integrated circuit, the first set of switches and a second set of switches. The method also includes providing, using a second integrated circuit, power to the second set of switches using a second high voltage supply and a second low voltage supply, the second high voltage supply and the second low voltage supply being connected to the second integrated circuit. The method also includes controlling, using the first set of switches and the second set of switches, an electric motor, wherein, the second integrated circuit is configured to: in response to a fault detected in the first integrated circuit, selectively control the first set of switches and the second set of switches, and, in response to at least one voltage value corresponding to a voltage of the first set of switches being outside of a threshold, performing a safe state operation.

Another aspect of the disclosed embodiments includes an apparatus. The apparatus includes: a first integrated circuit configured to: provide power to a first set of switches using a first high voltage supply and a first low voltage supply the first high voltage supply and the first low voltage supply being connected to the first integrated circuit, and selectively control the first set of switches and a second set of switches; a second integrated circuit configured to provide power to the second set of switches using a second high voltage supply and a second low voltage supply, the second high voltage supply and the second low voltage supply being connected to the second integrated circuit; and an electric motor controlled by the first set of switches and the second set of switches, wherein, the second integrated circuit being further configured to: in response to an internal signal of the first integrated circuit indicating a fault in the first integrated circuit, selectively control the first set of switches and the second set of switches, in response to the internal signal of the first integrated circuit indicating a discontinuance of the fault in the first integrated circuit, returning control of the first set of switches to the first integrated circuit, and, in response to at least one voltage value corresponding to a voltage of the first set of switches being outside of a threshold, performing a safe state operation.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
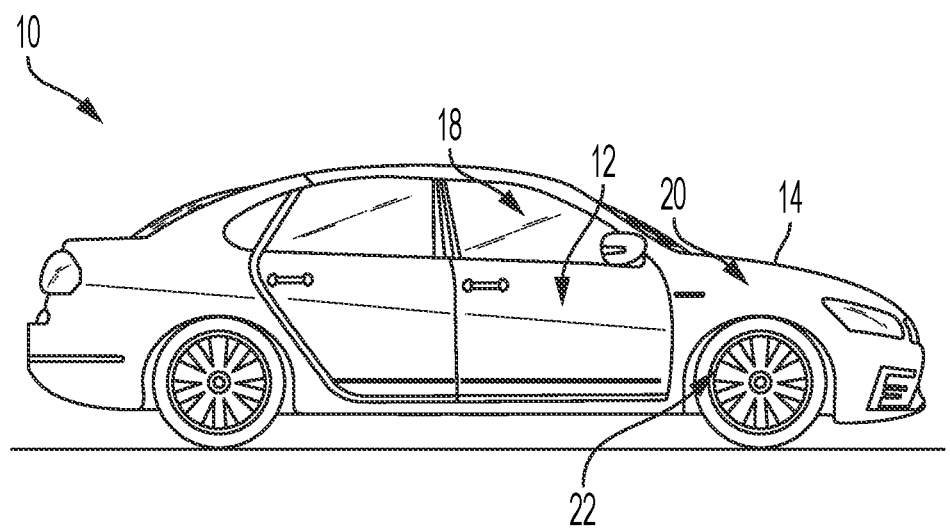
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, cross-overs, mini-vans, or other suitable vehicles, typically include various electric motors, such as permanent magnet motors or other suitable electric motors. Such electric motors may be used for various aspects of vehicle control or operation, such as vehicle prolusion or other suitable aspects of vehicle control or operation. Typically, an inverter or frequency converter (e.g., which may be referred to as an inverter system) controls speed or torque of such an electric motor. For example, the inverter may receive power from one or more power sources and may regulate power provided to the electric motor to control the motor speed or torque.

During operation, in the event of a failure in a component of the inverter system may be configured to maintain system safety by placing the system in a safe state. This is typically achieved, while a failure is present, by applying a minimum amount torque to the electric motor and by limiting back electromotive force (back emf) voltage from the electric motor (e.g., such that the back emf is lower than a voltage from a high voltage battery of the vehicle).

In typical inverter systems, an inverter box is configured to achieve the low torque safe state by applying one of the two conditions described by controlling three upper and/or three lower to be enhanced/closed or no switches enhanced/closed. Typically, a controller determines whether to enhance/close the switch, which may be referred to as inverter switches, using measured parameters, such as electric motor speed and/or supply voltage. In order to keep the system safe, such inverter systems may be configured to receive active measurements and apply switch enhancement states for any single point failure.

Typically, an inverter system uses two power supplies to supply power to the inverter box. The two power supplies may be referred to as a low voltage supply (e.g., or a low voltage power supply) and a high voltage supply (e.g., or a high voltage power supply). The high voltage supply may be derived from a high voltage battery (e.g., a battery may have a voltage rating being greater than or equal to 400 volts or other suitable battery voltage) and the low voltage supply may be associated with a separate power supply in the associated vehicle.

For the inverter system and/or the controller to take measurements, identify fault conditions, make decisions, and apply switch enhancements, various operational modes may be configured, such that the inverter system and/or the controller may continue to perform such function, while a single fault condition is present in the inventor system Additionally, or alternatively, typical inverter systems may employ a solution using various diodes illustrated. However, there are several disadvantages to such solutions. For example, such solutions typically include diode connections to supply what is commonly referred to as the safety supply. A short to ground on such a safety supply would not only disable all subsequent control and enhancement capability, but may also could disable the high voltage supply and the low voltage supply. Additionally, both the upper and lower switch enhancement circuitry of typical solutions may be powered from the same power supply, which may cause a single supply fault to not allow any switch enhancement. Further, typically, such solutions may include one control path for switch enhancement. A single fault along this control path may disable the typical inverter system from asserting proper switch enhancements. Additionally, the mechanism by which control is given or taken by the backup module of the typical inverter system may suffer from either low latency handover, multiple pin usage, or may only offer a one-way handoff to the backup module. Such limitations in the typical inverter system may make meeting safe state requirements difficult or impossible to meet.

Figure 3:
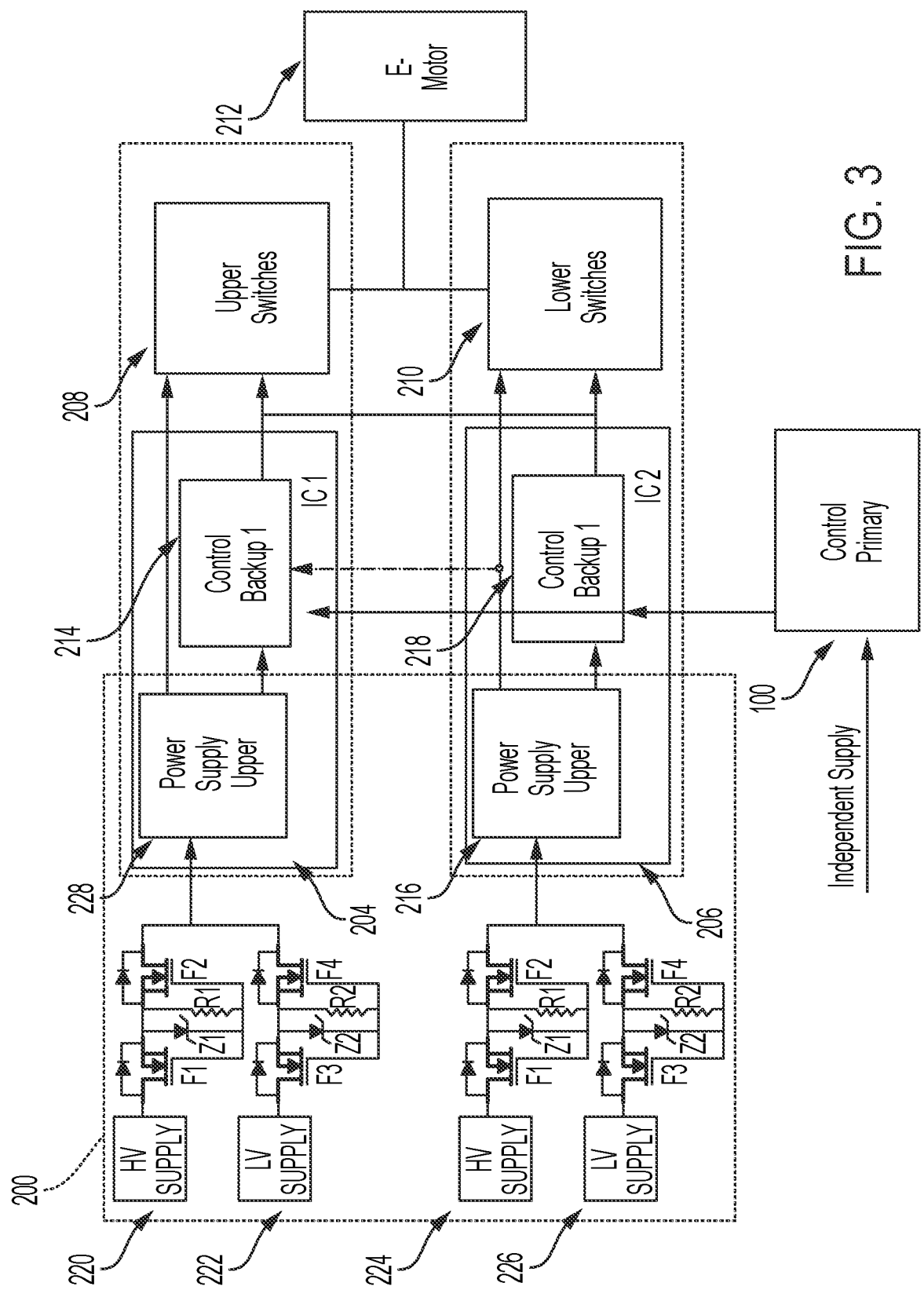
FIGS. 3-5 generally illustrate a dual supply dual control inverter system according to the principles of the present disclosure.

Accordingly, systems and methods, such as those described herein, that provide a safe state mode of operation in response to a single fault condition, may be desirable. In some embodiments, the systems and the methods described herein may be configured to provide a dual supply, dual control architecture. For example, with reference to FIGS. 3-5, an inverter system 200 includes a dual supply portion 202. The systems and methods described herein may be configured to provide dual supply selection by a single circuit, such as one of a first integrated circuit 204 or a second integrated circuit 206. While a first integrated circuit 204 and a second integrated circuit 206 are illustrated and described, it should be understood that the first integrated circuit 204 and/or the second integrated circuit 206 may include any suitable circuit, such as application-specific integrated circuits (ASICs), programmable logic arrays, optical processors, programmable logic controllers, microcode, microcontrollers, servers, microprocessors, digital signal processors, any other suitable circuit, or a combination thereof. The systems and methods described herein may be configured to prevent for a single point failure condition from collapsing both of the high voltage supply and low voltage supply.

In some embodiments, the systems and methods described herein may be configured to provide provides the capability to switch between the high voltage supply and the low voltage supply based on supply level (e.g., by one or both of the first integrated circuit 204 and the second integrated circuit 206 selecting from one of the high voltage supply and the low voltage supply during operation of the inverter system 200). The systems and methods described herein may be configured to ensure, during a fault condition of the inverter system 200, that a common fault does not disable both of the high voltage supply and the low voltage supply, while also allowing for the occurrence of many fault conditions, to continue to operate according to normal operating conditions. The systems and methods described herein may be configured to provide supply selection capability to each of the first integrated circuit 204 and the second integrated circuit 206, such that each of the first integrated circuit 204 and the second integrated circuit 206 may be fully self-sufficient in supplying all control associated with measurement and actuating motor switches, such as upper switches 208 and/or lower switches 210 to operate according to proper safe operation. It should be understood that the upper switches 208 may include any suitable number of switches and the lower switches 210 may include any suitable number of switches. The upper switches 208 and/or the lower switches 210 may be configured to control operation of an electric motor 212.

In some embodiments, the systems and methods described herein may be configured to allow half of the switches 208 and 210 to operate independently from the other half of the switches 208 and 210. The systems and methods described herein may be configured to allows each of the first integrated circuit 204 and the second integrated circuit 206 to supply power to either the upper switches 208 or lower switches 210 circuitry, while allowing each of the first integrated circuit 204 and the second integrated circuit 206 to perform measurement and control functions, which may keep the inverter system 200 in a safe operating state, even when half of the inverter system 200 has been affected by a fault condition.

In some embodiments, the systems and methods described herein may be configured to replicate the supply selection structure twice (e.g., once for each integrated circuit control and measurement capability), which may allow the dual architecture to supply, measure, and control the inverter system 200 for safe operation regardless of where any single fault might exist in the inverter system 200 (e.g., including within one of the first integrated circuit 204 or the second integrated circuit 206).

In some embodiments, the systems and methods described herein may be configured to connect a control mechanism 214 of the first integrated circuit 204 to a power supply upper mechanism 216 of the second integrated circuit 206 and to connect the control mechanism 214 to a control mechanism 218 of the second integrated circuit 206. This may allow for shared output control usage of switch control signals associated with the inverter system 200. Additionally, or alternatively, the systems and methods described herein may be configured to allow either one, but not both, of the control mechanism 214 and the control mechanism 218 to operate at the same time. In some embodiments, the systems and methods described herein may be configured to allow the control mechanism 214 and the control mechanism 218 to control only the upper switches 208. In some embodiments, the systems and methods described herein may be configured to allow the control mechanism 214 and the control mechanism 218 to control only the lower switches 210

In some embodiments, the systems and methods described herein may be configured to, under any fault condition, properly signal both the control mechanism 214 and the control mechanism 218 various output signals. The systems and methods described herein may be configured to allow tristate output drivers to attempt to control specific gate drive control commands, when one of the control mechanism 214 and the control mechanism 218 determines that the output drivers should be not tristated. As used herein, tristate output drivers may include digital output buffers configured to have three possible states: driven high (e.g., low impedance, driven low (e.g., low impedance), and high impedance. The driven high state and the driven low state may allow the digital output buffer to communicate, while the high impedance state allows other output buffers to drive a signal without high-current or bus connection issues.

In some embodiments, the systems and methods described herein may be configured to achieve single pin, bidirectional, and low latency handoff. Typical inventor systems may employ backup circuitry to allow for safe measurement and control using watchdog methodology or a square wave generated at a specific frequency as a signal to the backup circuitry. Watchdog monitoring requires many communications to transmit updated confirmation over the bus. This can lead to a relatively long period between failure detection (e.g., a loss of a watchdog), due to bandwidth concerns over the bus. Using a single pin frequency from main to backup can lower fault latency, but to accommodate gate driver control handoff and recovery capability in a synchronized and controlled manner may require many more pins to allow for a two-way communication that creates the release of the backup circuitry control of gate drive lines.

Figure 4:
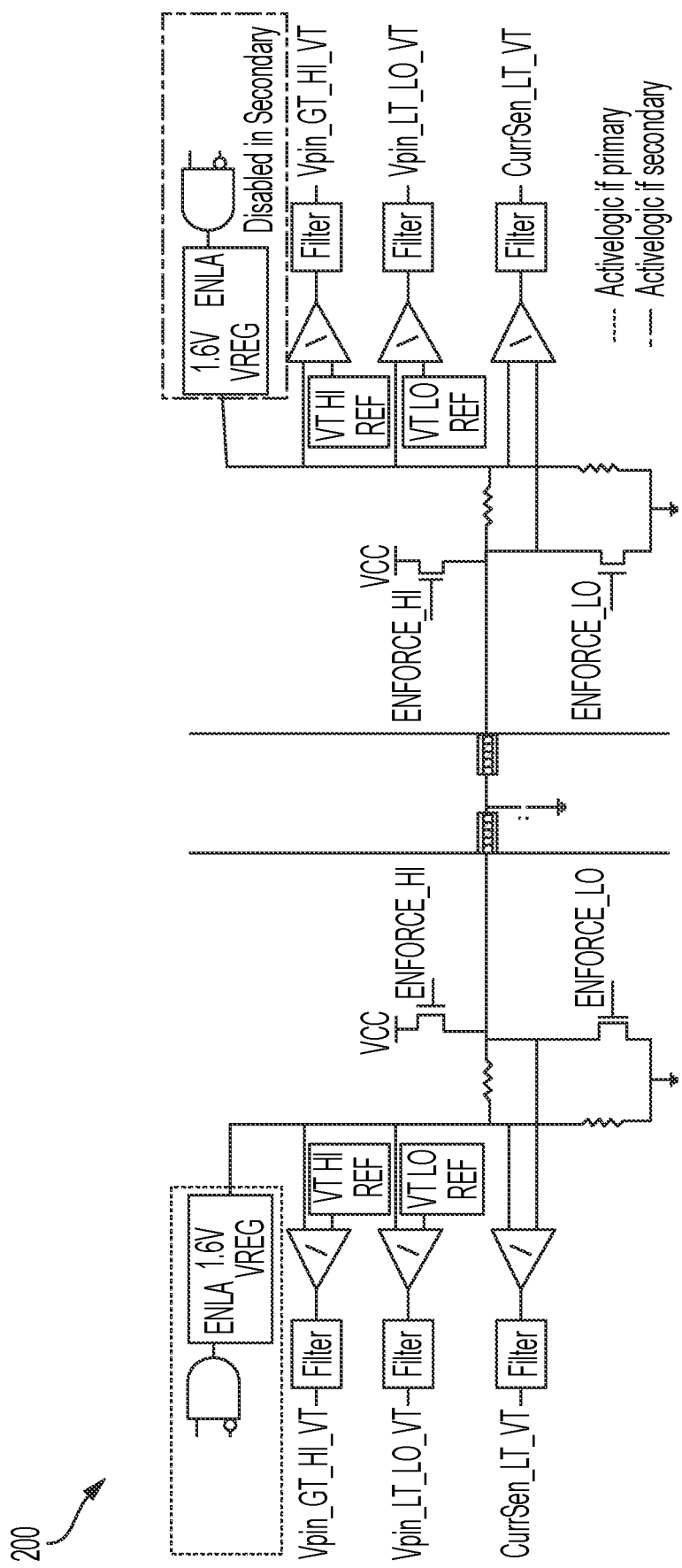

The systems and methods described herein, as is generally illustrated in FIG. 4, may be configured to use a single signal wire to convey a dual chip control state. The systems and methods described herein may be configured to allow for automatic control switching between primary and backup chipsets within a relatively short period (e.g., to stay below all fault tolerant time intervals). The systems and methods described herein may be configured to program one of the first integrated circuit 204 and the second integrated circuit 206 as a primary and to program the other as a backup (e.g., secondary). The systems and methods described herein may be configured to use a single line that connects the first integrated circuit 204 and the second integrated circuit 206 together.

In some embodiments, the first integrated circuit 204 and the second integrated circuit 206 include the same or substantially the same build. The inverter system 200 may include a voltage window comparator, a pulldown resistor, low current detection, voltage regulator, and pullup and pulldown switches, other suitable components, or a combination thereof.

Figure 5:
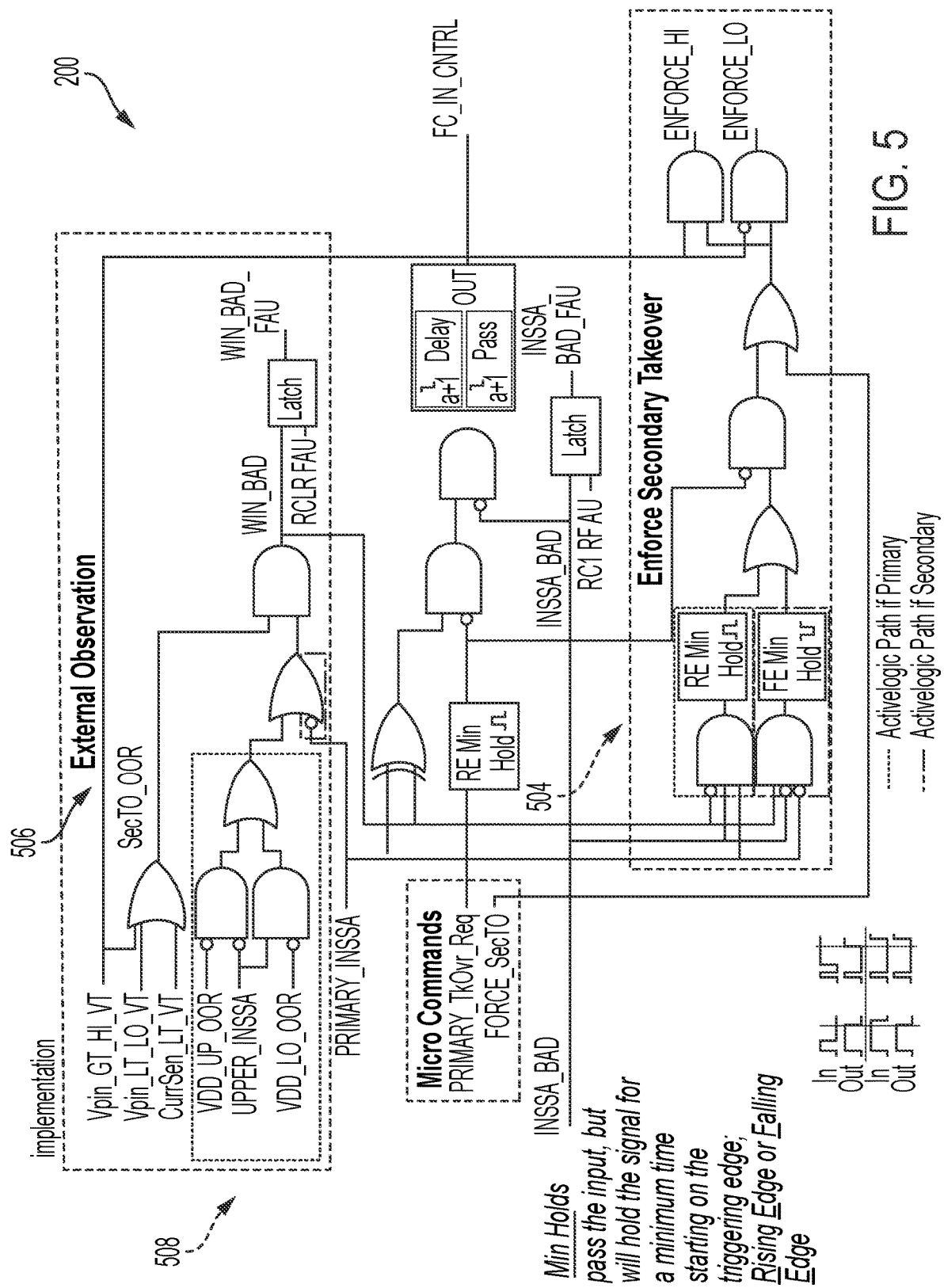

FIG. 5 generally illustrates conditions for how fault filtering, control handoff, and latching occurs according to the systems and methods described herein. For example, the signal "FC_IN_CNTRL" is the final signal that contains when the specific chipset (e.g., the first integrated circuit 204 or the second integrated circuit 206) should be in control of the gate drive control. At 504, an "enforce secondary takeover" portion of the inverter system 200 illustrates that when a SCNDRY_TKVR external line is outside of a predetermined voltage window, minimum hold times are implemented to re-enforce the pull to the voltage threshold being crossed.

At 506, an "external observation" portion of the inverter system 200 illustrates what is a "WIN_BAD" condition for the SCNDRY_TKVR line. At 508, an exception to the voltage level is illustrated, where a pin of the secondary may be shorted to ground through the common ESD protection circuitry short, and the detection method may be that the VDD supply would be low. In such a condition, the primary device says in control. When the primary integrated circuit determines that all of the primary integrated circuit functions are in proper operation and capability (e.g., INSSA_BAD goes low), the regulator will be enabled and attempt to regulate the "SCNDRY_TKVR" pin. The backup integrated circuit may use the voltage levels setup to determine that the regulated voltage is within the predetermined range. If the voltage is not within that range, then the backup integrated circuit reinforces a voltage level outside of that window, keeping control of the pin. If the pin voltage is within the voltage window, the pin voltage conveys that the primary integrated circuit is in control. Alternatively, if the pin voltage is outside of the window, the pin voltage conveys that the backup integrated circuit is in control. This may allow for loss of correct operation on the primary integrated circuit without actively driving the signal low to allow for the backup integrated circuit to recognize and filter the signal and take over safe operation of the inverter system 200. In some embodiments, control may be transferred from the programmed primary integrated circuit to the programmed backup integrated circuit by third device, such as a vehicle controller. This transfer may be initiated via a command signal called FORCE_SecTo, which may pull the SCNDRY_TKVR regulation low.

In some embodiments, the backup integrated circuit may give up control and the primary integrated circuit may automatically take over control of the inverter system 200. Upon command over SPI to PRIMARY_TkOvr_Req signal OR upon the INSSA of the backup integrated circuit determining that the backup integrated circuit cannot correctly control the inverter system 200, the primary integrated circuit may be allowed to re-regulate the SCNDRY_TKVR line and allow for primary integrated circuit to take over control. In some embodiments, the systems and methods described herein may be configured to solve all the issues of a digital signal only methods of typical inverter systems and may be configured to provide a more cost effective benefits over the typical inverter systems.

In some embodiments, the systems and methods described herein may be configured to provide a first integrated circuit may be further configured to provide power to a first set of switches using a first high voltage supply and a first low voltage supply the first high voltage supply and the first low voltage supply being connected to the first integrated circuit. The first integrated circuit may be further configured to selectively control the first set of switches and a second set of switches. The first high voltage supply may be connected in parallel to the first low voltage supply.

In some embodiments, the first set of switches and the second set of switches being connected to and configured to selectively control the electric motor. The electric motor may include a permanent magnet motor or other suitable electric motor. The electric motor may be associated with a vehicle. It should be understood that, while the systems and methods disclosed herein are described as being associated with a vehicle, it should be understood the systems and methods disclosed herein may be applicable to any suitable application.

In some embodiments, the second integrated circuit may be further configured to provide power to the second set of switches using a second high voltage supply and a second low voltage supply, the second high voltage supply and the second low voltage supply being connected to the second integrated circuit. The second high voltage supply may be connected in parallel to the second low voltage supply.

In some embodiments, the second integrated circuit may be further configured to, in response to a fault detected in the first integrated circuit, selectively control the first set of switches and the second set of switches, while the first integrated circuit provides power to the first set of switches and the second integrated circuit provides power to the second set of switches. In some embodiments, the at least one voltage value or frequency indicates a fault in the inverter. In some embodiment, the second integrated circuit may be further configured to detect the fault in the first integrated circuit based on an internal signal of the first integrated circuit.

In some embodiments, the second integrated circuit may be further configured to, in response to at least one voltage value or frequency corresponding to a voltage of the first set of switches being outside of a threshold, performing a safe state operation. In some embodiments, the second integrated circuit may be configured to perform the safe state operation by turning off the first set of switches and the second set of switches. In some embodiments, the second integrated circuit may be configured to perform the safe state operation by enhancing the first set of switches and the second set of switches.

In some embodiments, in response to a discontinuance of the fault in the first integrated circuit, the second integrated circuit may return control of the first set of switches to the first integrated circuit. In some embodiments, in response to a determination that a subsequent voltage value or frequency corresponding to the voltage of the first set of switches is within the threshold, the second integrated circuit may return the first set of switches and the second set of switches to a normal operating state.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
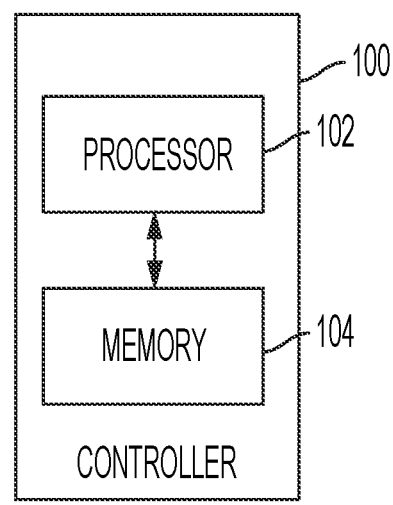
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

In some embodiments, the controller 100 may be configured to selectively instruct one of the first integrated circuit 204 and the second integrated circuit 206 to operate as the primary and/or secondary integrated circuit, respectively. Additionally, or alternatively, the inverter system 200 may operate independent of the controller 100.

In some embodiments, the first integrated circuit 204 may be configured to provide power to the upper switches 208 using power supplied from a first high voltage supply 220 and/or a first low voltage supply 222. The first high voltage supply 220 and the first low voltage supply 222 may be connected to the first integrated circuit 204. The first high voltage supply 220 may be connected in parallel to the first low voltage supply 222. The first integrated circuit 204 may be further configured to selectively control the upper switches 208. The upper switches 208 may operate (e.g., responsive to control b the first integrated circuit 204) using power supplied a power supply upper 228 of the first integrated circuit 204.

The second integrated circuit 206 may be configured to provide power to the upper switches 208 using s power supplied from a second high voltage supply 224 and a second low voltage supply 226. The second high voltage supply 224 and the second low voltage supply 226 may be connected to the second integrated circuit 206. The second high voltage supply 224 may be connected in parallel to the second low voltage supply 226. The second integrated circuit 206 may be further configured to selectively control the lower switches 210. The lower switches 210 may operate (e.g., responsive to control the second integrated circuit 206) using power supplied by the power supply upper mechanism 216.

The upper switches 208 and/or the lower switches 210 may selectively control the electric motor 212. The electric motor may include a permanent magnet motor or other suitable electric motor. The electric motor may include any suitable electric motor within the vehicle 10. Alternatively, the electric motor may include any suitable motor associated with any suitable system or application include the vehicle 10 and/or other than the vehicle 10.

In some embodiments, at least one of the first integrated circuit 204 and the second integrated circuit 206 may be further configured to selectively control all of the upper switches 208 and the lower switches 210 based on at least one voltage value corresponding to a respective a first high voltage supply of the upper switches 208 and/or the lower switches 210. At least one voltage value or frequency may indicate a single fault in the inverter system 200. At least one of the first integrated circuit 204 and/or the second integrated circuit 206 may be configured to act as a backup integrated circuit to the other of the first integrated circuit 204 and the second integrated circuit 206 in response to the at least one voltage value or frequency indicating the single fault in the inverter system 200.

In some embodiments, the first integrated circuit 204 may be further configured to provide power to upper switches 208, as described. The first integrated circuit 204 may selectively control the upper switches 208 and the lower switches 210. The second integrated circuit 206 may be further configured to provide power to the lower switches 210, as described.

In some embodiments, the second integrated circuit 206 may be further configured to detect a fault in the first integrated circuit 204. For example, the second integrated circuit 206 may receive a signal from the first integrated circuit indicating that at least one characteristic of the first integrated circuit 204 is outside of a corresponding threshold. For example, the signal may indicate that a temperature of the first integrated circuit 204 is greater than a threshold temperature. The second integrated circuit 206 may determine a fault occurred in the first integrated circuit 204, based on the signal.

The second integrated circuit 206, in response to the detected in the first integrated circuit 204, may take control of the upper switches 208 and the lower switches 210 from the first integrated circuit 204. While the second integrated circuit 206 controls the upper switches 208 and the lower switches 210, the first integrated circuit 204 may continue to provide power to the upper switches 208 and the second integrated circuit 206 may continue to provide power to the lower switches 210.

In some embodiments, the second integrated circuit 206 may be further configured to measure, independent of the first integrated circuit 204, a voltage supporting the use to the upper switches 208 (e.g., which may be referred to herein as a voltage corresponding to the upper switches 208, a voltage associated with the upper switches 208, a voltage of the upper switches 208, and the like). For example, the upper switches 208 may be connected to a positive high voltage supply (e.g., having a voltage supply of ~+200 volts or other suitable value) and the lower switches 210 may be connected to a negative high voltage supply (e.g., having a voltage supply of ~−200 volts or other suitable value). The voltage supporting the use of the upper switches 208 may be associated with the positive high voltage supply (e.g. and a voltage supporting the use of the lower switches 210 (e.g., which may be referred to herein as a voltage corresponding to the lower switches 210, a voltage associated with the lower switches 210, a voltage of the lower switches 210, and the like) may be associated with the negative high voltage supply). The second integrated circuit 206 may, in response to the voltage being outside of a threshold, perform a safe state operation. In some embodiments, the second integrated circuit 206 may be configured to perform the safe state operation by turning off the upper switches 208 and the lower switches 210. In some embodiments, the second integrated circuit 206 may be configured to perform the safe state operation by enhancing the upper switches 208 and the lower switches 210.

In some embodiments, in response to a discontinuance of the fault in the first integrated circuit 204, the second integrated circuit 206 may return control of the upper switches 208 and/or the lower switches 210 to the first integrated circuit 204. In some embodiments, in response to a determination that a subsequent voltage of the upper switches 208 being within the threshold, the second integrated circuit 206 may return the upper switches 208 and the lower switches 210 to a normal operating state. It should understood that, while the first integrated circuit 204 is described herein as being the primary integrated circuit and the second integrated circuit 206 is described herein as being the secondary integrated circuit, either of the first integrated circuit 204 and the second integrated circuit 206 may be designated the primary or secondary integrated circuit. Accordingly, the first integrated circuit 204 may be configured to perform the same or similar functions as the second integrated circuit 206 and/or the second integrated circuit 206 may be configured to perform the same or similar functions of the first integrated circuit 204.

In some embodiments, the controller 100 and/or the inverter system 200 may perform the methods described herein. However, the methods described herein as performed by the controller 100 and/or the inverter system 200 are not meant to be limiting, and any type of software executed on a controller or processor can perform the methods described herein without departing from the scope of this disclosure. For example, a controller, such as a processor executing software within a computing device, can perform the methods described herein.

Figure 6:
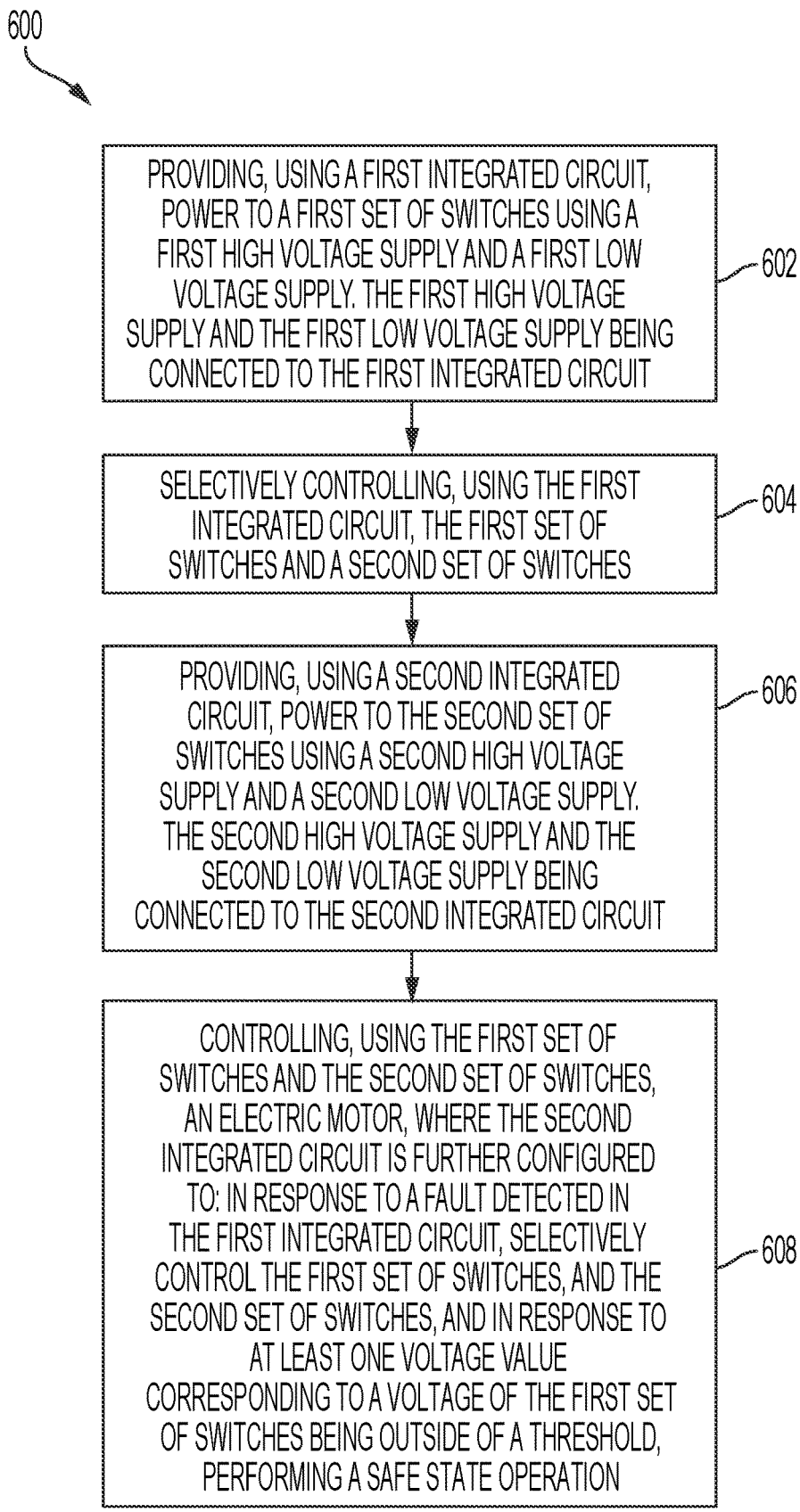
FIG. 6 is a flow diagram generally illustrating a dual supply dual control method according to the principles of the present disclosure.

FIG. 6 is a flow diagram generally illustrating a dual supply dual control method 600 according to the principles of the present disclosure. At 602, the method 600 provides, using the first integrated circuit 204, power to a first set of switches, such as the upper switches 208, using a first high voltage supply, such as the first high voltage supply 220, and a first low voltage supply, such as the first low voltage supply 222. The first high voltage supply 220 and the first low voltage supply 222 may be connected to the first integrated circuit 204.

At 604, the method 600 selectively controls, using the first integrated circuit 204, the first set of switches (e.g., the upper switches 208) and a second set of switches (e.g., the lower switches 210).

At 606, the method 600 provides, using a second integrated circuit, such as the second integrated circuit 206, power to the second set of switches (e.g., the lower switches 210) using a second high voltage supply, such as the second high voltage supply 224, and a second low voltage supply, such as the second low voltage supply 226. The second high voltage supply and the second low voltage supply may be connected to the second integrated circuit 206.

At 608, the method 600 controls, using the first set of switches (e.g., the upper switches 208) and the second set of switches (e.g., the lower switches 210), an electric motor, such as the electric motor 212. In some embodiments, the second integrated circuit 206 is configured to, in response to a fault detected in the first integrated circuit 204, selectively control the first set of switches (e.g., the upper switches 208) and the second set of switches (e.g., the lower switches 210). In some embodiments, the second integrated circuit 206 is configured to, in response to at least one voltage value corresponding to a voltage of the first set of switches (e.g., the upper switches) being outside of a threshold, perform a safe state operation.

Clause 1. A system for an inverter comprising: a first integrated circuit configured to: provide power to a first set of switches using a first high voltage supply and a first low voltage supply the first high voltage supply and the first low voltage supply being connected to the first integrated circuit, and selectively control the first set of switches and a second set of switches; a second integrated circuit configured to provide power to the second set of switches using a second high voltage supply and a second low voltage supply, the second high voltage supply and the second low voltage supply being connected to the second integrated circuit; and an electric motor being connected to the first set of switches and the second set of switches, wherein, the second integrated circuit is further configured to: in response to an a fault detected in the first integrated circuit, selectively control the first set of switches and the second set of switches, and, in response to at least one voltage value corresponding to a voltage of the first set of switches being outside of a threshold, performing a safe state operation.

Clause 2. The system of clause 1, wherein the first high voltage supply is connected in parallel to the first low voltage supply.

Clause 3. The system of clause 1, wherein the second high voltage supply is connected in parallel to the second low voltage supply.

Clause 4. The system of clause 1, wherein the at least one voltage value indicates a fault in the inverter.

Clause 5. The system of clause 1, wherein the second integrated circuit is further configured to detect the fault in the first integrated circuit based on an internal signal of the first integrated circuit.

Clause 6. The system of clause 1, wherein the electric motor includes a permanent magnet motor.

Clause 7. The system of clause 1, wherein the electric motor is associated with a vehicle.

Clause 8. The system of clause 1, wherein the first set of switches and the second set of switches selectively control operation of the electric motor.

Clause 9. The system of clause 1, wherein the second integrated circuit is configured to perform the safe state operation by turning off the first set of switches and the second set of switches.

Clause 10. The system of clause 1, wherein the second integrated circuit is configured to perform the safe state operation by enhancing the first set of switches and the second set of switches.

Clause 11. The system of clause 1, wherein, in response to the second integrated circuit selectively controls the first set of switches and the second set of switches, the first integrated circuit provides power to the first set of switches and the second integrated circuit provides power to the second set of switches.

Clause 12. The system of clause 1, wherein, in response to a discontinuance of the fault in the first integrated circuit, the second integrated circuit returns control of the first set of switches to the first integrated circuit.

Clause 13. A method comprising: providing, using a first integrated circuit, power to a first set of switches using a first high voltage supply and a first low voltage supply the first high voltage supply and the first low voltage supply being connected to the first integrated circuit; selectively controlling, using the first integrated circuit, the first set of switches and a second set of switches; providing, using a second integrated circuit, power to the second set of switches using a second high voltage supply and a second low voltage supply, the second high voltage supply and the second low voltage supply being connected to the second integrated circuit; controlling, using the first set of switches and the second set of switches, an electric motor, wherein, the second integrated circuit is configured to: in response to an a fault detected in the first integrated circuit, selectively control the first set of switches and the second set of switches, and, in response to at least one voltage value corresponding to a voltage of the first set of switches being outside of a threshold, performing a safe state operation.

Clause 14. The method of clause 13, wherein the electric motor includes a permanent magnet motor.

Clause 15. The method of clause 13, wherein the electric motor is associated with a vehicle.

Clause 16. The method of clause 13, wherein the second integrated circuit is configured to perform the safe state operation by turning off the first set of switches and the second set of switches.

Clause 17. The method of clause 13, wherein the second integrated circuit is configured to perform the safe state operation by enhancing the first set of switches and the second set of switches.

Clause 18. The method of clause 13, wherein, in response to the second integrated circuit selectively controls the first set of switches and the second set of switches, the first integrated circuit provides power to the first set of switches and the second integrated circuit provides power to the second set of switches.

Clause 19. The method of clause 13, wherein, in response to a discontinuance of the fault in the first integrated circuit, the second integrated circuit returns control of the first set of switches to the first integrated circuit.

Clause 20. An apparatus comprising: a first integrated circuit configured to: provide power to a first set of switches using a first high voltage supply and a first low voltage supply the first high voltage supply and the first low voltage supply being connected to the first integrated circuit, and selectively control the first set of switches and a second set of switches; a second integrated circuit configured to provide power to the second set of switches using a second high voltage supply and a second low voltage supply, the second high voltage supply and the second low voltage supply being connected to the second integrated circuit; and an electric motor controlled by the first set of switches and the second set of switches, wherein, the second integrated circuit being further configured to: in response to an internal signal of the first integrated circuit indicating a fault in the first integrated circuit, selectively control the first set of switches and the second set of switches, in response to the internal signal of the first integrated circuit indicating a discontinuance of the fault in the first integrated circuit, returning control of the first set of switches to the first integrated circuit, and, in response to at least one voltage value corresponding to a voltage of the first set of switches being outside of a threshold, performing a safe state operation.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A system for an inverter including a first set of switches and a second set of switches to control an operation of an electric motor, the system comprising:
    a first integrated circuit configured to:
        provide power to the first set of switches using a first high voltage supply and a first low voltage supply, the first high voltage supply and the first low voltage supply being connected to the first integrated circuit, and
        selectively control the first set of switches and the second set of switches; and
    a second integrated circuit configured to:
        provide power to the second set of switches using a second high voltage supply and a second low voltage supply, the second high voltage supply and the second low voltage supply being connected to the second integrated circuit, and
        in response to a fault detected in the first integrated circuit, selectively control the first set of switches and the second set of switches, and
        in response to at least one voltage value corresponding to a voltage of the first set of switches being outside of a threshold, performing a safe state operation.

2. The system of claim 1, wherein the first high voltage supply is connected in parallel to the first low voltage supply.

3. The system of claim 1, wherein the second high voltage supply is connected in parallel to the second low voltage supply.

4. The system of claim 1, wherein the at least one voltage value indicates a fault in the inverter.

5. The system of claim 1, wherein the second integrated circuit is further configured to detect the fault in the first integrated circuit based on an internal signal of the first integrated circuit.

6. The system of claim 1, wherein the electric motor includes a permanent magnet motor.

7. The system of claim 1, wherein the electric motor is associated with a vehicle.

8. The system of claim 1, wherein the first set of switches and the second set of switches selectively control operation of the electric motor.

9. The system of claim 1, wherein the second integrated circuit is configured to perform the safe state operation by turning off the first set of switches and the second set of switches.

10. The system of claim 1, wherein the second integrated circuit is configured to perform the safe state operation by enhancing the first set of switches and the second set of switches.

11. The system of claim 1, wherein, in response to the second integrated circuit selectively controls the first set of switches and the second set of switches, the first integrated circuit provides power to the first set of switches and the second integrated circuit provides power to the second set of switches.

12. The system of claim 1, wherein, in response to a discontinuance of the fault in the first integrated circuit, the second integrated circuit returns control of the first set of switches to the first integrated circuit.

13. A method comprising:
    providing, using a first integrated circuit, power to a first set of switches using a first high voltage supply and a first low voltage supply the first high voltage supply and the first low voltage supply being connected to the first integrated circuit;
    selectively controlling, using the first integrated circuit, the first set of switches and a second set of switches;
    providing, using a second integrated circuit, power to the second set of switches using a second high voltage supply and a second low voltage supply, the second high voltage supply and the second low voltage supply being connected to the second integrated circuit;
    controlling, using the first set of switches and the second set of switches, an electric motor, wherein, the second integrated circuit is configured to:
        in response to a fault detected in the first integrated circuit, selectively control the first set of switches and the second set of switches, and
        in response to at least one voltage value corresponding to a voltage of the first set of switches being outside of a threshold, performing a safe state operation.

14. The method of claim 13, wherein the electric motor includes a permanent magnet motor.

15. The method of claim 13, wherein the electric motor is associated with a vehicle.

16. The method of claim 13, wherein the second integrated circuit is configured to perform the safe state operation by turning off the first set of switches and the second set of switches.

17. The method of claim 13, wherein the second integrated circuit is configured to perform the safe state operation by enhancing the first set of switches and the second set of switches.

18. The method of claim 13, wherein, in response to the second integrated circuit selectively controls the first set of switches and the second set of switches, the first integrated circuit provides power to the first set of switches and the second integrated circuit provides power to the second set of switches.

19. The method of claim 13, wherein, in response to a discontinuance of the fault in the first integrated circuit, the second integrated circuit returns control of the first set of switches to the first integrated circuit.

20. An apparatus comprising:
    a first integrated circuit configured to:
        provide power to a first set of switches using a first high voltage supply and a first low voltage supply, the first high voltage supply and the first low voltage supply being connected to the first integrated circuit, and
        selectively control the first set of switches and a second set of switches; and
    a second integrated circuit configured to provide power to the second set of switches using a second high voltage supply and a second low voltage supply, the second high voltage supply and the second low voltage supply being connected to the second integrated circuit,
    wherein the second integrated circuit is further configured to:

in response to an internal signal of the first integrated circuit indicating a fault in the first integrated circuit, selectively control the first set of switches and the second set of switches, in response to the internal signal of the first integrated circuit indicating a discontinuance of the fault in the first integrated circuit, returning control of the first set of switches to the first integrated circuit, and in response to at least one voltage value corresponding to a voltage of the first set of switches being outside of a threshold, performing a safe state operation.

\* \* \* \* \*

UNITED STATES PATENT AND TRADEMARK OFFICE
CERTIFICATE OF CORRECTION

| | |
|---|---|
| PATENT NO. | : 11,837,984 B2 |
| APPLICATION NO. | : 17/320752 |
| DATED | : December 5, 2023 |
| INVENTOR(S) | : Mark W. Gose et al. |

It is certified that error appears in the above-identified patent and that said Letters Patent is hereby corrected as shown below:

On the Title Page

ABSTRACT, Line 8, delete "an a" and insert --a--.

In the Claims

Column 16, Line 11, in Claim 13, delete "first low voltage supply the first high voltage supply" and insert --first low voltage supply, the first high voltage supply--.

Signed and Sealed this
Thirtieth Day of January, 2024

*Katherine Kelly Vidal*

Katherine Kelly Vidal
*Director of the United States Patent and Trademark Office*